(12) United States Patent
Ghosh et al.

(10) Patent No.: US 9,842,076 B2
(45) Date of Patent: Dec. 12, 2017

(54) SWITCHLESS USB C-CONNECTOR HUB

(71) Applicant: Microchip Technology Incorporated, Chandler, AZ (US)

(72) Inventors: Atish Ghosh, Austin, TX (US); Donald L. Perkins, Austin, TX (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 189 days.

(21) Appl. No.: 14/701,924

(22) Filed: May 1, 2015

(65) Prior Publication Data
US 2015/0331826 A1 Nov. 19, 2015

Related U.S. Application Data

(60) Provisional application No. 62/000,103, filed on May 19, 2014.

(51) Int. Cl.
*G06F 13/20* (2006.01)
*G06F 13/40* (2006.01)
*G06F 13/42* (2006.01)

(52) U.S. Cl.
CPC ...... *G06F 13/4022* (2013.01); *G06F 13/4027* (2013.01); *G06F 13/4282* (2013.01); *G06F 2213/0042* (2013.01); *Y02B 60/1228* (2013.01); *Y02B 60/1235* (2013.01)

(58) Field of Classification Search
CPC ........ H01R 24/60; H01R 4/185; H01R 11/03; H01R 2107/00; G06F 13/382; G06F 13/4022; G06F 13/4282; G06F 13/4027; G06F 13/385; G06F 13/36; G06F 2213/0042
See application file for complete search history.

(56) References Cited

U.S. PATENT DOCUMENTS

| 2006/0136666 A1* | 6/2006 | Pang ..................... G06F 3/0607 |
| | | 711/114 |
| 2012/0102255 A1 | 4/2012 | Moore .......................... 710/313 |
| 2013/0217274 A1* | 8/2013 | Bar-Niv ................. H01R 27/02 |
| | | 439/676 |
| 2013/0275640 A1* | 10/2013 | Wang ..................... G06F 13/36 |
| | | 710/300 |

FOREIGN PATENT DOCUMENTS

WO 01/04764 A1 1/2001 ............. G06F 13/12

OTHER PUBLICATIONS

Edward Chester, "USB Type-C to be slimmer and reversible", Dec. 4, 2013, Bit-Tech, p. 1.*
Vlad Savoy, "This is the reversible USB cable that will end your frustrations", Apr. 2, 2014, The Verge, pp. 1-2.*
International Search Report and Written Opinion, Application No. PCT/US2015/031354, 8 pages, dated Oct. 6, 2015.

* cited by examiner

*Primary Examiner* — Ernest Unelus
(74) *Attorney, Agent, or Firm* — Slayden Grubert Beard PLLC (57) ABSTRACT

A USB hub integrated circuit device, comprising USB hub logic comprising a plurality USB ports, wherein at least one port comprises a pair of bi-directional transmission channels, wherein for the at least one port two physical layers are provided in parallel, each physical layer being associated with one bidirectional transmission channel, wherein the USB hub logic is further configured to select one of said physical layers for each port depending on a logic condition.

17 Claims, 7 Drawing Sheets

SWITCHLESS USB C-CONNECTOR HUB

CROSS-REFERENCE TO RELATED APPLICATIONS

This application claims the benefit of U.S. Provisional Application No. 62/000,103 filed on May 19, 2014, which is incorporated herein in its entirety.

TECHNICAL FIELD

The present disclosure relates to USB hubs, in particular to USB hubs with USB symmetrical connectors.

BACKGROUND

The new USB Type-C connector has been developed to help enable thinner and sleeker product designs, enhance usability and provide a growth path for performance enhancements for future versions of USB. The type-C connector is built on existing USB 3.1 and USB 2.0 technologies.

SUMMARY

According to various embodiments, a multiport USB2 and/or USB3 hub integrated circuit device can be provided that comprises a "type-C" connector compatible for both standards.

According to an embodiment, a USB hub integrated circuit device may comprise USB hub logic comprising a plurality USB ports, wherein at least one port comprises a pair of bi-directional transmission channels, wherein for the at least one port two physical layers are provided in parallel, each physical layer being associated with one bidirectional transmission channel, wherein the USB hub logic is further configured to select one of said physical layers for each port depending on a logic condition.

According to a further embodiment, the at least one port can be a USB3 compliant port. According to a further embodiment, the logic condition can be determined through another connection provided by the at least one port. According to a further embodiment, the at least one port further may comprise a further transmission channel compliant with USB2. According to a further embodiment, the USB hub integrated circuit device may further comprise another port comprising a pair of bi-directional transmission channels, wherein for the another port two further physical layers are provided in parallel, each physical layer being associated with one bidirectional transmission channel of the another port, wherein the at least one port is a down-stream port and the another port is an up-stream port. According to a further embodiment, the USB hub integrated circuit device may further comprise at least one USB 2 legacy port. According to a further embodiment, the USB hub integrated circuit device may further comprise an embedded controller configured to control a selection of respective physical layers of each port. According to a further embodiment, the USB hub integrated circuit device may further comprise a multiplexer associated with the at least one port and configured to either select signals provided by the first or second physical layer. According to a further embodiment, the physical layer may provide a plurality of transmission and reception digital lines for each bidirectional channel. According to a further embodiment, the plurality of transmission and reception digital lines may comprise 32 transmission lines and 32 reception lines. According to a further embodiment, the plurality of transmission and reception digital lines can be configured to transmit signals at a clock rate of 125 MHz.

According to another embodiment, a USB hub may comprise a USB hub integrated circuit device as described above, further comprising an external connector having connection pins that are arranged symmetrical that first bi-directional lines of an associated plug inserted into the external connector are either connected with first bi-directional lines of the connector or second bi-directional lines of the connector depending on an insertion direction of the plug. According to a further embodiment of the USB hub, the connector may comprise a row of upper connection pins and a row of lower connection pins, wherein the upper row may comprise in sequence the following USB signals: Gnd, TX1+, TX1−, VBUS, CC1, D+, D−, TBD, VBUS, RX2−, RX2+, Gnd, and the lower row may comprise in sequence the following USB signals: Gnd, RX1+, RX1−, VBUS, TBD, D−, D+, CC2, VBUS, TX2−, TX2+, Gnd, wherein TBD designates a connection which may not be used. According to a further embodiment of the USB hub, the two ports are USB3 compliant ports. According to a further embodiment of the USB hub, the logic condition can be determined through the CC1 or CC2 signal of each port. According to a further embodiment of the USB hub, the USB hub may further comprise at least one USB 2 legacy port. According to a further embodiment of the USB hub, the USB hub integrated circuit device may further comprise an embedded controller configured to control a selection of respective physical layers of each port.

According to yet another embodiment, a method for operating a USB hub comprising a USB hub integrated circuit device as described above and further comprise an external USB Type-C connector having connection pins that are arranged symmetrical that first bi-directional lines of an associated plug inserted into the external connector are either connected with first bi-directional lines of the connector or second bi-directional lines of the connector depending on an insertion direction of the plug, wherein the method may comprise the steps of plugging in USB3 Type-C plug into the USB3 Type-C connector in a first configuration; decoding configuration lines coupled to respective configuration contacts of the USB3 Type-C connector by the USB hub; selecting a first one of the physical layers associated with the USB3 Type-C connector.

According to a further embodiment of the method, when said USB3 Type-C plug is plugged into the USB3 Type-C connector in a second configuration which is upside down with respect to the first configuration, the method may comprise decoding the configuration lines of the USB3 Type-C connector by the USB hub; and selecting a second one of the physical layers associated with the USB3 Type-C connector.

DETAILED DESCRIPTION

A USB3 Type-C connector is reversible and requires no external USB3 switch to function. Such an external connections is preferred in USB3 hubs as it provides the convenience of allowing plugs to be inserted in any direction, for example up-side up or upside down. According to various embodiments, no external switching circuitry is necessary and all switch functions are handled internally. The Type-C connector can be used for both, USB host and USB device.

According to an embodiment, a USB hub integrated circuit device may have a very small pin count in comparison with conventional integrated USB hub devices. The above mentioned functionality can be added without increasing the number of pins.

Figure 1:
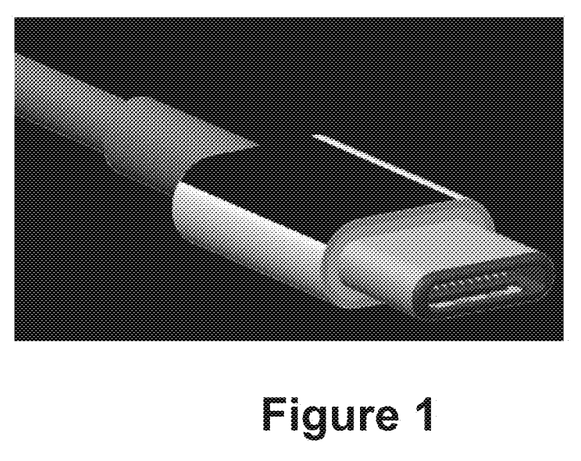
FIG. 1 shows a USB3 Type-C male plug.
Figure 2:
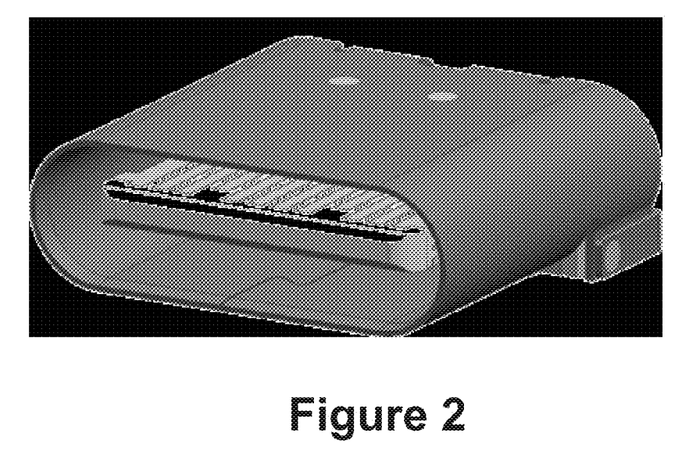
FIG. 2 shows a USB3 Type-C female connector.

FIGS. 1 and 2 show a USB Type-C male plug and associated female connector, respectively. This type of connector is symmetric in its design and thus does not require to be inserted in one predefined direction. Rather it may be inserted up-side up or down for the convenience of the user. Such a connector may have a predetermined number of pins, for example 24 pins as defined in the USB 3.1 standard.

Figure 3A:
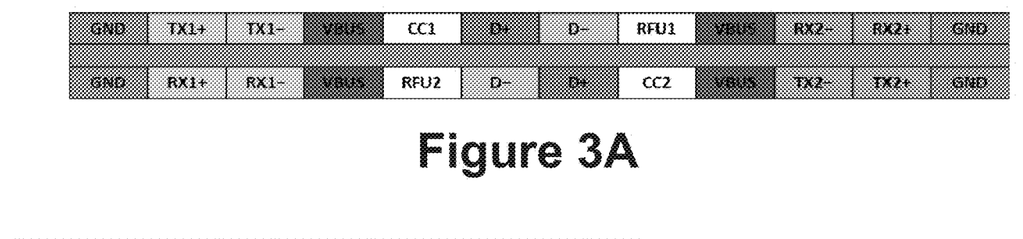
FIG. 3A, B, C shows the pin layout of a Type-C connector and association with a connected plug.
Figure 3B:
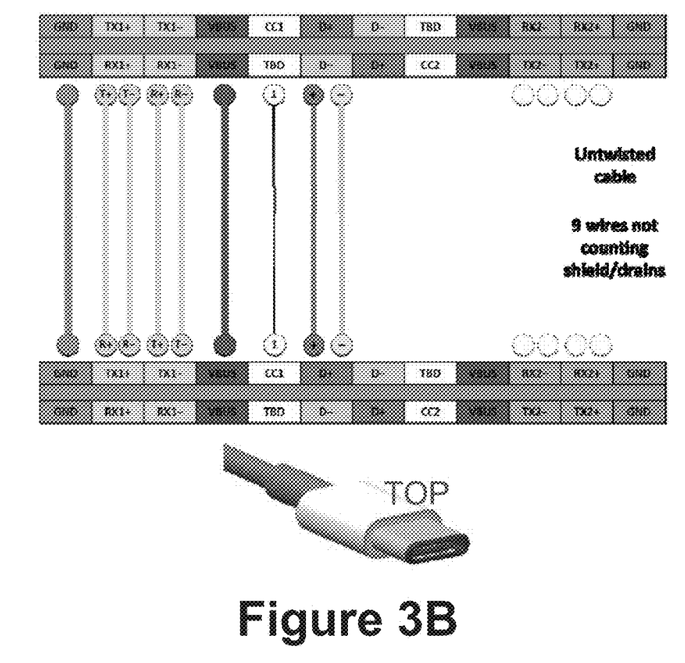
Figure 3C:
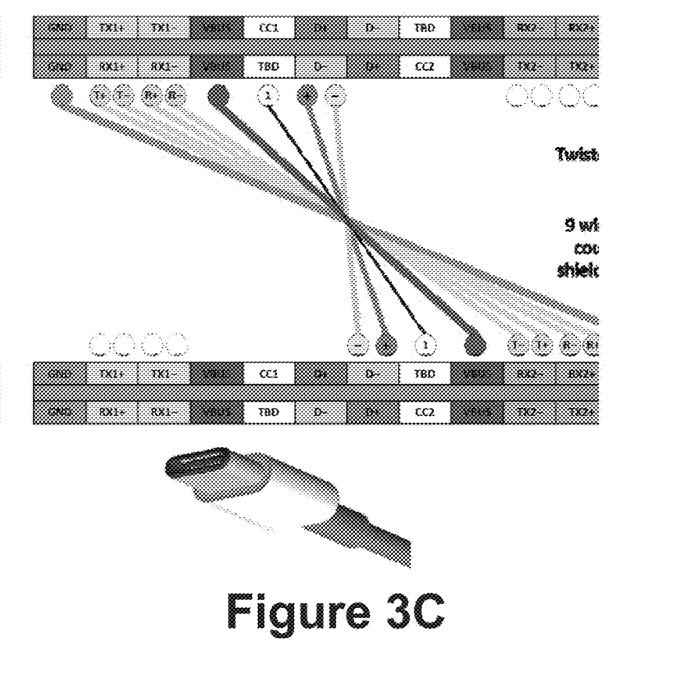

FIG. 3A shows an exemplary layout design. FIG. 3B shows an association of pins of the female connector and the male plug when inserted upside up. FIG. 3C shows an association of pins of the female connector and the male plug when inserted upside down. As can be seen in FIGS. 3B and 3C, the symmetric design provides a one-to-one connection for most lines no matter which way the connector is plugged in. This is true, in particular for the four legacy USB1/2 lines: Gnd, VBUS, D+, and D−. However, the additional USB 3 bidirectional transmission line pairs TX1, RX1 and TX2, RX2− lines will be connected only correctly when the connector is plugged in the "correct" way, namely upside up. However, when the connector is plugged in upside down, the channels will be switched such TX1 connects to RX2 and TX2 connects to RX1. For a better overview, FIG. 3 only shows the standard USB connections and the connections for bidirectional channel 1. The connections for channel 2, namely RX+, RX2− and TX2+, TX2− are not shown for a better overview.

Thus, this "mismatch" must be resolved within the hub device. To this end, additional control lines CC1, CC2 are used as shown in FIG. 3A-C. These lines can be used to control respective switches as, for example, shown in FIG. 4. Through these control lines CC1, CC2 and associated logic, a switching device within the hub is controlled to provide the correct connection of the respective channels.

Figure 4:
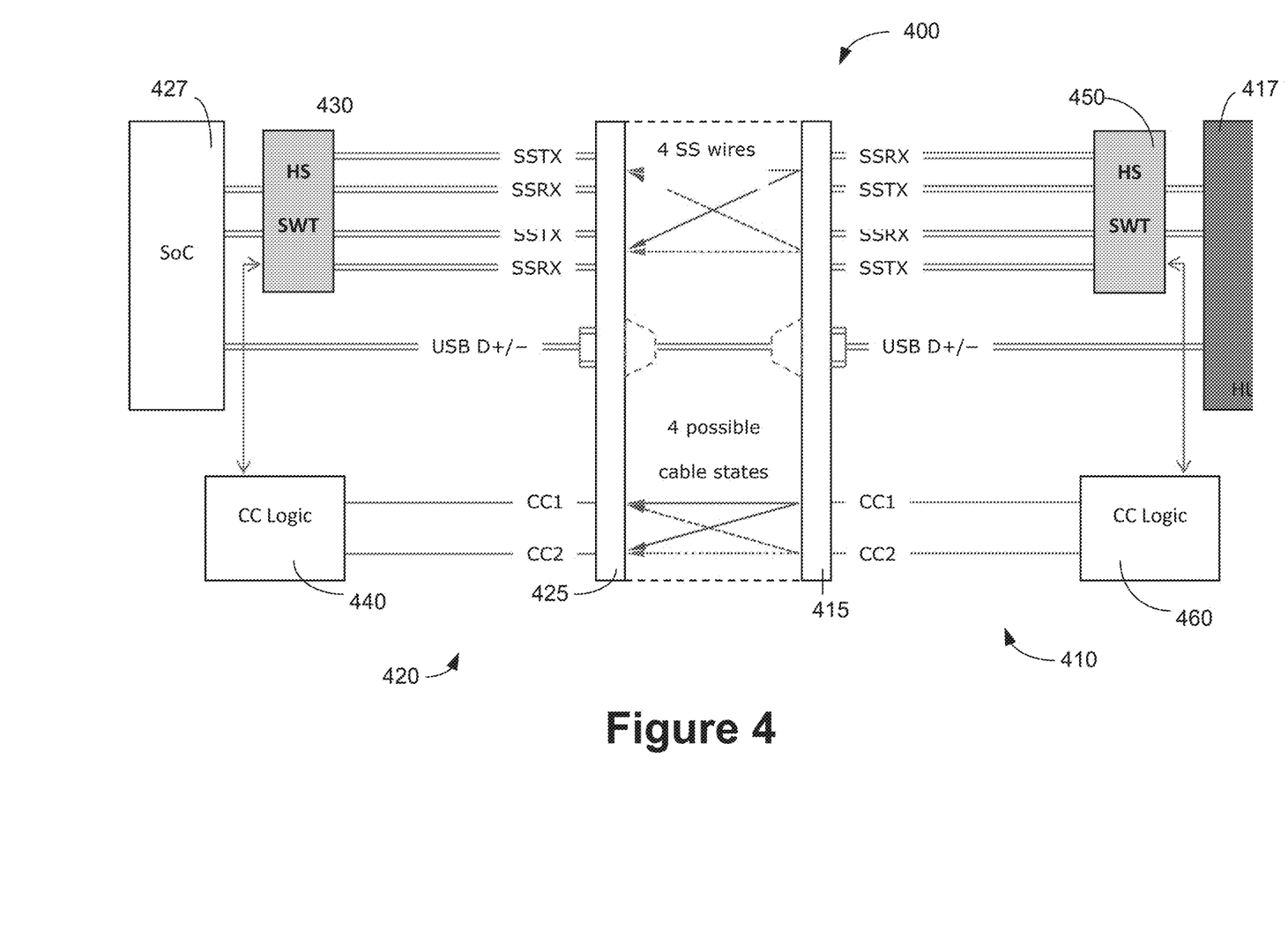
FIG. 4 shows a circuit diagram with USB hub and a connected USB3 device.

FIG. 4 shows an arrangement 400 with a USB hub or host 410 and a USB device 420. On the left side the USB device 420 comprises a switching circuitry 430 arranged between the male plug 425 and the internal controller 427 that allows for the proper connection of the additional USB3 transmission channels. A logic unit 440 is provided that analyzes the status of the connection on the CC lines and controls the switching circuitry 430. The USB hub or host 410 may also provide for a similar circuitry with switching circuitry 550 arranged between the female connector 415 and the hub 417 and associated switching device 550 controlled by logic unit 460. As shown in FIG. 4, the two CC lines provide for four possible cable states. Switching can be performed either in the hub 410 or the device 420 depending on the control signals through control lines CC1 and CC2.

Figures 5A, 5B, 5C:
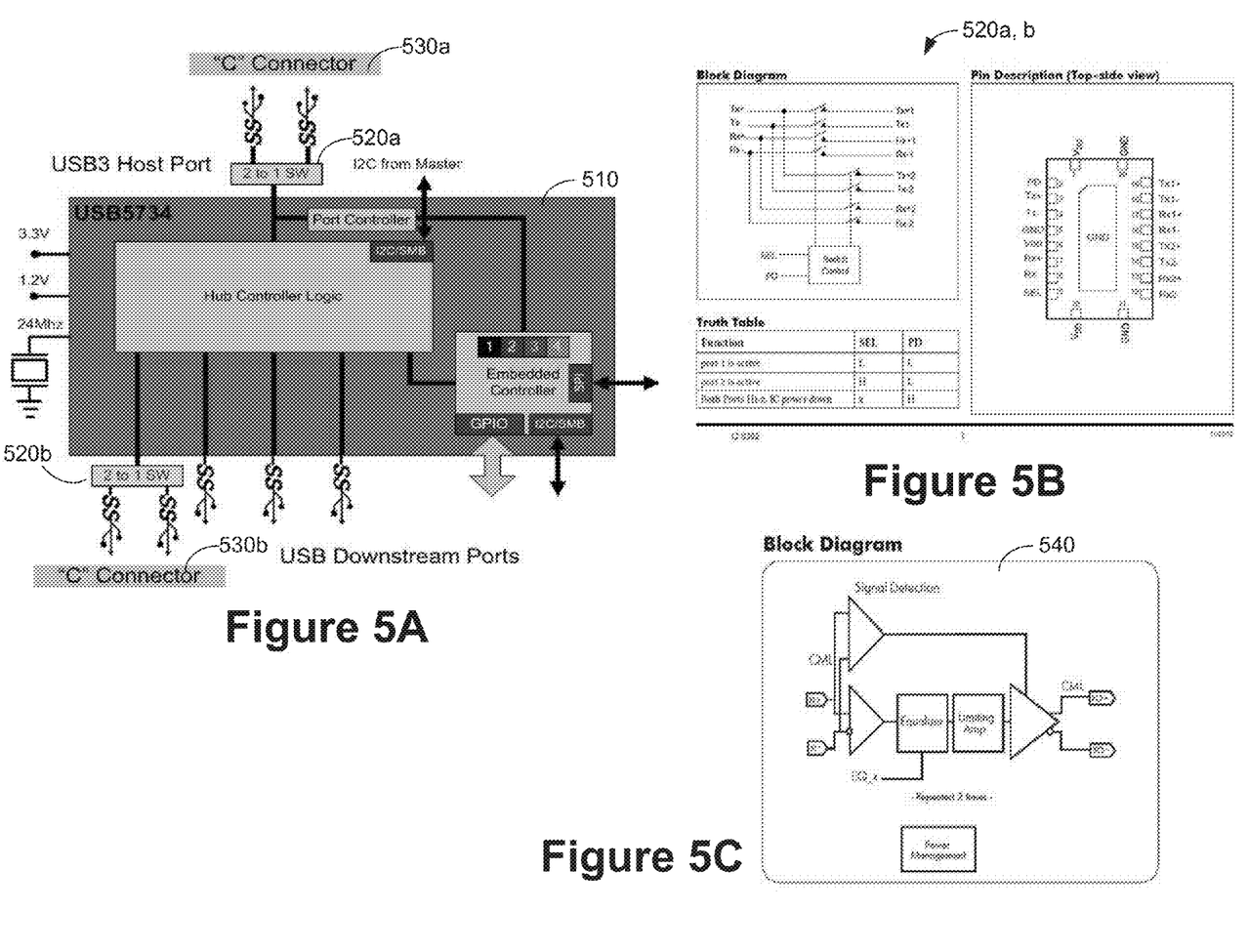
FIG. 5A shows a block diagram of a USB hub with Type-C connectors.
FIG. 5B shows an external switch of FIG. 5 in more detail.
FIG. 5C shows a re-driver that can be used in the circuit shown in FIG. 5.

FIG. 5A shows another block diagram with a central integrated circuit device 510 providing the main USB hub functionality. FIG. 5A shows that two type-C connectors 530a and 530b may be provided. Thus, two external 2-to-1 switches/multiplexers 520a, b are provided to ensure for the correct connection when using type-C connectors. An exemplary switching device 520a, b is shown in FIG. 5B in more detail. Optionally so-called re-drivers 540 as shown in FIG. 5C may be necessary to ensure signal integrity. FIG. 5B shows a typical switching device 520a, b which is used to select either the first bi-directional or the second bi-directional channel. These switching devices are integrated circuit devices that comprises a plurality of respective MOS switching transistors, drivers and switching logic to provide for the correct connection. Even when acquired in high numbers these devices increase production costs significantly.

Moreover, such switching devices 520a, b may not even be suitable for the high frequency signals transmitted over the bi-directional line pairs. Thus, so-called re-drivers 540 may be used in addition or instead as shown in FIG. 5C. These devices may be able to handle the high bandwidth and provide adjustable receiver equalization and respective control logic. However, such devices are even more expensive than conventional multiplexer switches.

Figure 6:
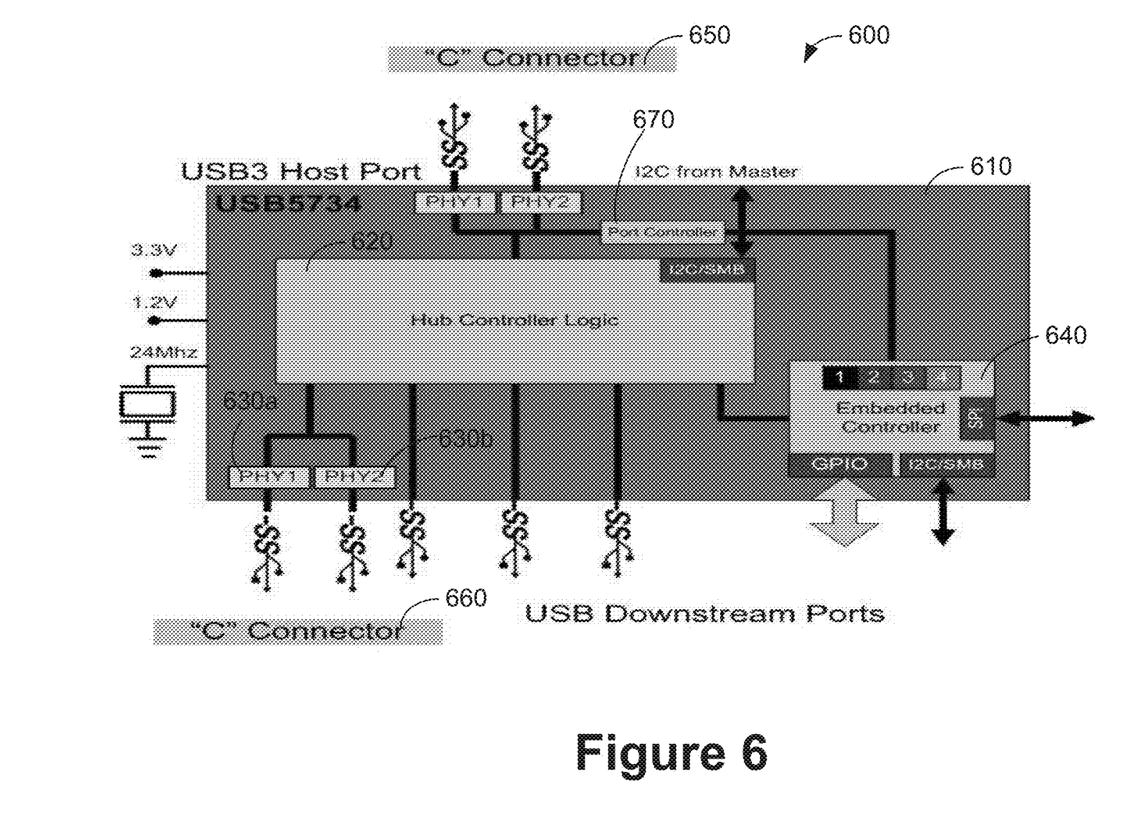
FIG. 6 shows an embodiment of an integrated circuit hub device according to various embodiments.

According to various embodiments, as shown for example in FIG. 6, an USB hub integrated circuit device 610 can be provided which provides for the switching within the digital domain of the integrated circuit device 610. Thus, no external switches or re-drivers are necessary between the connectors 650, 660 and the integrated circuit device 610 of the USB3 hub 600. Shown in FIG. 6 is a USB 3 hub integrated circuit device 610 that allows "C-type" connector inter connectivity by means of two Type-C connectors 650 and 660. The scheme retains the ability to support legacy "A" and "B" connectors. The multiplexers can be bypassed if "C" ports are not required.

FIG. 6 shows that the hub 610 comprises internally the same number of USB connections with respect to the internal hub controller logic 620. However, two physical layers 630a, b may be provided for any of the USB links. In the example of FIG. 6, one up-stream USB3 port and one down-stream USB3 port are provided with this configuration. The hub may further comprise an embedded controller 640 providing for external general purpose pins and serial interfaces and being configured to control the hub controller logic 620. FIG. 6 only shows the dual physical layer arrangement for the Type-C connector of one downstream port and the up-stream port as mentioned above. However, the other down-stream ports or some of the other down-stream ports may have similar dual physical layer arrangements. When implemented the physical layers may be controlled by an associated port control unit 670 (only one shown in FIG. 6).

Figure 7:
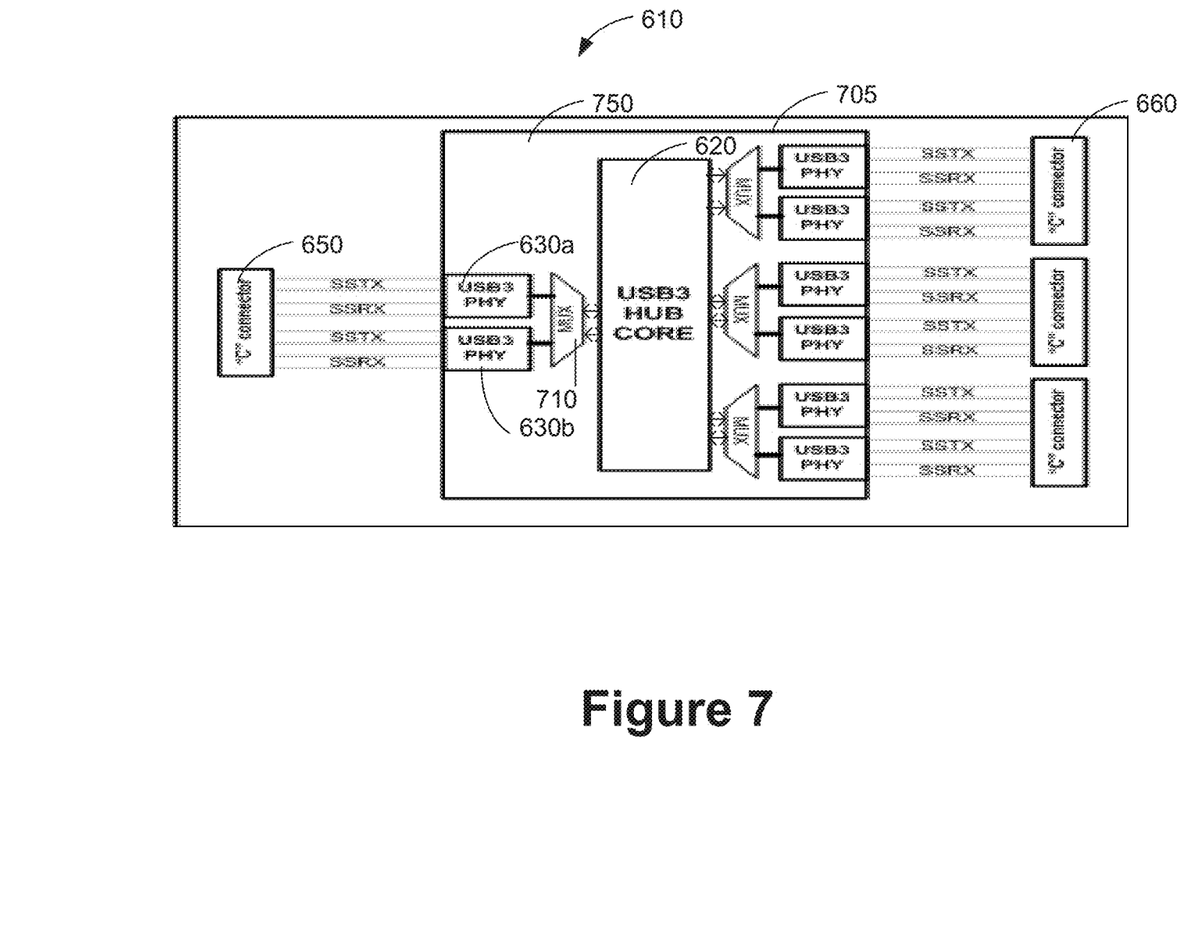
FIG. 7 shows a more detailed block diagram of an embodiment according to FIG. 8.

FIG. 7 shows a more detailed block diagram of the USB hub device 610 according to various embodiments. As for example shown in FIG. 7, the switching is moved from analog to the digital domain 750 inside the integrated hub device 705. Instead of switching at 5 Ghz USB3 signals, the PIPE interface is multiplexed after the physical layer 630a, b by means of a multiplexer 710 configured to cross switch the first and second bidirectional channel. Digital multiplexing can therefore be performed at a lower frequency, for example 125 Mhz for 32 bits. Only the physical layer 630*a, b* is required to be implemented twice.

FIG. 7 shows an integrated circuit device 705 comprising USB hub core 620, multiplexers 710, and physical layers 630*a, b* within the integrated circuit device. The hub core 620 comprises, for example, three USB3 down-stream ports on the right side and one USB3 up-stream port on the left side. Only the extended transmission channels are shown in FIG. 7. In addition, the hub core 620 also provides the standard USB2 compatible connection lines (not shown) which do not require multiplexing as discussed above.

The extended transmission lines of each USB3 port of the hub core 620 are connected with respective outputs/inputs on the hub core side of a multiplexer 710. The multiplexer 710 acts as a cross switch and may comprise, for example, the capability of switching 32 lines per channel. Each channel comprises separate TX and RX lines for each channel. On the other side of the multiplexer 710, the first channel is coupled to a first physical layer 630*a* and the second channel to a second physical layer 630*b*. The external ports of the first and second physical layers 630*a, b* can then be connected to a single Type-C connector 650, 660 in addition to the standard USB1/2 lines as shown in FIG. 4.

As shown such an integrated circuit device 705 requires the additional physical layers 630*a, b* and associated multiplexers 710 to be able to associate the correct bidirectional channels from the connectors 650, 660 to the core 620. The multiplexers 710 may be controlled according to the CC1 and CC2 signals which basically indicate which way a male plug has been inserted into the female connector 650, 660 by connecting either the respective CC1 connection of the plug with the CC1 connection of the female connector or the CC1 connection of the plug with the CC2 connection of the female connector as shown in FIG. 4.

According to an embodiment, the logic decoding the CC connections may enable only one of the physical layers which may save power consumption if necessary. For a USB1/2 legacy mode, the physical layers 630*a, b* and associated multiplexer 710 may be deactivated entirely. According to some embodiments, the logic for decoding the CC connections may be implemented by the embedded controller 640. According to other embodiments, a separate logic may be implemented to decode the CC connection. However, both physical layers 630*a, b* may be active all the time and the multiplexer 710 may be controlled to simply associate/link the correct bidirectional channels with each other. Moreover, any embodiment according to the present disclosure may provide for an arrangement that uses less power due to the fact that no external switches/multiplexers are necessary. Thus, internally, the correct bi-directional transmission channels are connected with each other no matter how a user inserts the USB type-C plug into the respective type-C hub connector.

According to other embodiments, other switching means may be implemented within the integrated circuit device to provide for a similar function.

Figure 8:
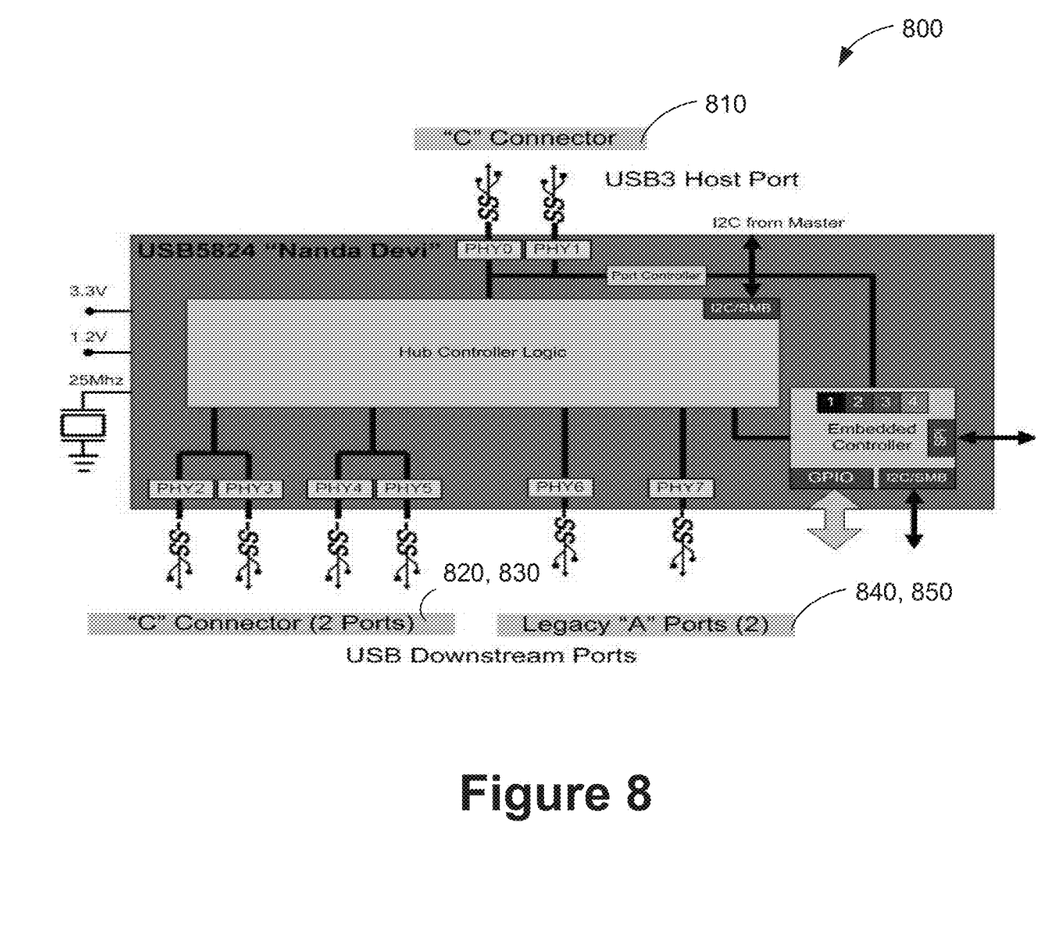
FIG. 8 shows another embodiment of an integrated circuit hub device.

FIG. 8 shows an example of USB3 hub device 800 comprising one up-stream Type-C port 810, two down-stream Type-C ports 820, 830 and two legacy USB1/2 downstream ports 840, 850. FIG. 8 does not show the internal multiplexers and only shows switching logic controlled by the embedded controller for the up-stream port. Furthermore, the standard USB1/2 ports for the Type-C connectors 810-830 are again not shown in FIG. 8 to provide a better overview.

The additional silicon real estate is not significant and therefore the costs for such an implementation is significantly less than that of an external switch and/or re-driver. Thus, system level savings are high when using an integrated circuit device according to various embodiments.

What is claimed is:

1. A USB hub integrated circuit device, comprising
USB hub logic comprising a plurality USB ports, wherein:
at least one port comprises a pair of bi-directional transmission channel;
two physical layers are directly connected to the at least one port, wherein each physical layer being associated with one bidirectional transmission channel;
the USB hub logic is further configured to select one and only one of said physical layers for each port depending on a logic condition; and
the at least one port is a USB3 compliant port.

2. The USB hub integrated circuit device according to claim 1, wherein the logic condition is determined through another connection provided by the at least one port.

3. The USB hub integrated circuit device according to claim 2, wherein the at least one port further comprises a further transmission channel compliant with USB2.

4. The USB hub integrated circuit device according to claim 1, further comprising another port comprising a pair of bi-directional transmission channels, wherein for the another port two further physical layers are provided in parallel, each physical layer being associated with one bidirectional transmission channel of the another port, wherein the at least one port is a down-stream port and the another port is an up-stream port.

5. The USB hub integrated circuit device according to claim 4, further comprising at least one USB 2 legacy port.

6. The USB hub integrated circuit device according to claim 1, further comprising an embedded controller configured to control a selection of respective physical layers of each port.

7. The USB hub integrated circuit device according to claim 1, further comprising a multiplexer associated with the at least one port and configured to either select signals provided by the first or second physical layer.

8. The USB hub integrated circuit device according to claim 7, wherein the physical layer provides a plurality of transmission and reception digital lines for each bidirectional channel.

9. The USB hub integrated circuit device according to claim 8, wherein the plurality of transmission and reception digital lines comprise 32 transmission lines and 32 reception lines.

10. The USB hub integrated circuit device according to claim 9, wherein the plurality of transmission and reception digital lines are configured to transmit signals at a clock rate of 125 MHz.

11. A USB hub comprising:
a USB hub integrated circuit device including USB hub logic including a plurality of USB ports, wherein:
at least one port comprises a pair of bi-directional transmission channels;
two physical layers are directly connected to the at least one port, each physical layer being associated with one bidirectional transmission channel; and
the USB hub logic is further configured to select one and only one of said physical layers for each port depending on a logic condition; and
an external connector having connection pins that are arranged symmetrical such that first bi-directional lines of an associated plug inserted into the external connector are either connected with first bi-directional lines of the connector or second bi-directional lines of the connector depending on an insertion direction of the plug;

wherein the at least one port is a USB3 compliant port.

12. The USB hub according to claim 11, wherein the connector comprises a row of upper connection pins and a row of lower connection pins, wherein the upper row comprises in sequence the following USB signals: Gnd, TX1+, TX1−, VBUS, configuration channel 1 (CC1), D+, D−, TBD, VBUS, RX2−, RX2+, Gnd, and the lower row comprises in sequence the following USB signals: Gnd, RX1+, RX1−, VBUS, TBD, D−, D+, configuration channel 2 (CC2), VBUS, TX2−, TX2+, Gnd, wherein TBD designates a connection which may not be used.

13. The USB hub according to claim 12, wherein the logic condition is determined through the CC1 or CC2 signal of each port.

14. The USB hub according to claim 11, further comprising at least one USB 2 legacy port.

15. The USB hub according to claim 11, wherein the USB hub integrated circuit device further comprises an embedded controller configured to control a selection of respective physical layers of each port.

16. A method for operating a USB hub, the USB hub comprising:

a USB integrated circuit device including USB hub logic including a plurality of USB ports, wherein:

at least one port comprises a pair of bi-directional transmission channels;

two physical layers are directly connected to the at least one port, wherein each physical layer being associated with one bidirectional transmission channel; and the USB hub logic is further configured to select one and only one of said physical layers for each port depending on a logic condition; and an external USB Type-C connector having connection pins that are arranged symmetrical that first bi-directional lines of an associated plug inserted into the external connector are either connected with first bi-directional lines of the connector or second bi-directional lines of the connector depending on an insertion direction of the plug;

the method comprising:

plugging in USB3 Type-C plug into the USB3 Type-C connector in a first configuration;

decoding configuration lines coupled to respective configuration contacts of the USB3 Type-C connector by the USB hub; and selecting a first one of the physical layers associated with the USB3 Type-C connector.

17. The method according to claim 16, wherein when said USB3 Type-C plug is plugged into the USB3 Type-C connector in a second configuration which is upside down with respect to the first configuration, the method comprises:

decoding the configuration lines of the USB3 Type-C connector by the USB hub; and selecting a second one of the physical layers associated with the USB3 Type-C connector.

* * * * *